(12) United States Patent
Kumar et al.

(10) Patent No.: US 9,989,660 B2
(45) Date of Patent: Jun. 5, 2018

(54) CORRECTING TIME SHIFTS

(71) Applicant: PGS Geophysical AS, Oslo (NO)

(72) Inventors: Jyoti Kumar, London (GB); Guilherme Jangelme, Surrey (GB)

(73) Assignee: PGS Geophysical AS, Oslo (NO)

( * ) Notice: Subject to any disclaimer, the term of this patent is extended or adjusted under 35 U.S.C. 154(b) by 241 days.

(21) Appl. No.: 14/728,086

(22) Filed: Jun. 2, 2015

(65) Prior Publication Data

US 2016/0178773 A1    Jun. 23, 2016

Related U.S. Application Data

(60) Provisional application No. 62/093,652, filed on Dec. 18, 2014.

(51) Int. Cl.
G01V 1/36 (2006.01)
G01V 1/30 (2006.01)

(52) U.S. Cl.
CPC ............. *G01V 1/362* (2013.01); *G01V 1/303* (2013.01); *G01V 2210/532* (2013.01); *G01V 2210/6222* (2013.01)

(58) Field of Classification Search
CPC ..... G01V 1/362; G01V 1/303; G01V 2210/52
USPC ..................... 367/51, 52
See application file for complete search history.

(56) References Cited

U.S. PATENT DOCUMENTS

| 5,008,861 A * | 4/1991 | Gallagher | G01V 1/288 367/38 |
| 5,258,960 A * | 11/1993 | Swan | G01V 1/303 367/38 |
| 5,933,789 A * | 8/1999 | Byun | G06F 17/10 367/48 |
| 6,625,543 B1 * | 9/2003 | Bevc | G01V 1/32 702/14 |
| 6,799,118 B2 | 9/2004 | MacKay | |
| 2006/0193205 A1 * | 8/2006 | Herkenhoff | G01V 1/362 367/47 |

OTHER PUBLICATIONS

Lacombe, Celine, et al. "Correction for water velocity variations and tidal statics", SEG, New Orleans 2006 Annual Meeting, pp. 2881-2885.
Luis Da Silva Ritter, Gerson, "Water velocity estimation using inversion methods", Geophysics, vol. 75, No. 1, Jan.-Feb. 2010, p. U1-U8.

* cited by examiner

*Primary Examiner* — Ian J Lobo

(57) ABSTRACT

At least some of the example embodiments are methods including: performing Normal MoveOut (NMO) correction on a first Common Depth Point (CDP) gather, the NMO correction based on a reference velocity of sound in water, the NMO correction creates first NMO data with a plurality of traces; selecting a first estimated velocity that makes travel time represented in the traces substantially the same; calculating a zero-offset time shift that represents a difference in travel time as between the reference velocity and the first estimated velocity at a zero-offset trace; performing NMO correction on the first CDP gather based on a final estimated velocity to create second NMO data; adding the zero-offset time shift to each trace of the second NMO data; and then performing reverse NMO correction on the second NMO data to create corrected data.

6 Claims, 10 Drawing Sheets

US 9,989,660 B2

CORRECTING TIME SHIFTS

CROSS-REFERENCE TO RELATED APPLICATIONS

This application claims the benefit of U.S. Provisional Application Ser. No. 62/093,652 filed Dec. 18, 2014 and titled "Correcting Time Shifts." The provisional application is incorporated by reference herein as if reproduced in full below.

BACKGROUND

Geophysical surveying is a technique where two- or three-dimensional "pictures" of the state of an underground formation are taken. Geophysical surveying takes place not only on land, but also in marine environments (e.g., ocean, large lakes). Marine geophysical survey systems use a plurality of sensor streamers, which contain one or more sensors, to detect acoustic energy emitted by one or more sources reflected from a hydrocarbon reservoir and/or associated subsurface formations beneath the sea floor. Multiple geophysical surveys taken over time may be referred to as 4D surveying.

An issue encountered in 4D marine geophysical surveying is that variation in temperature, salinity, and/or density of the water as between distinct marine geophysical surveys results in differences in speed of sound in the water and thus differences in arrival times of acoustic signals as between geophysical surveys. The differences in speed of sound may be referred to as "water column static."

BRIEF DESCRIPTION OF THE DRAWINGS

For a detailed description of exemplary embodiments, reference will now be made to the accompanying drawings in which.

DEFINITIONS

Figure 1:
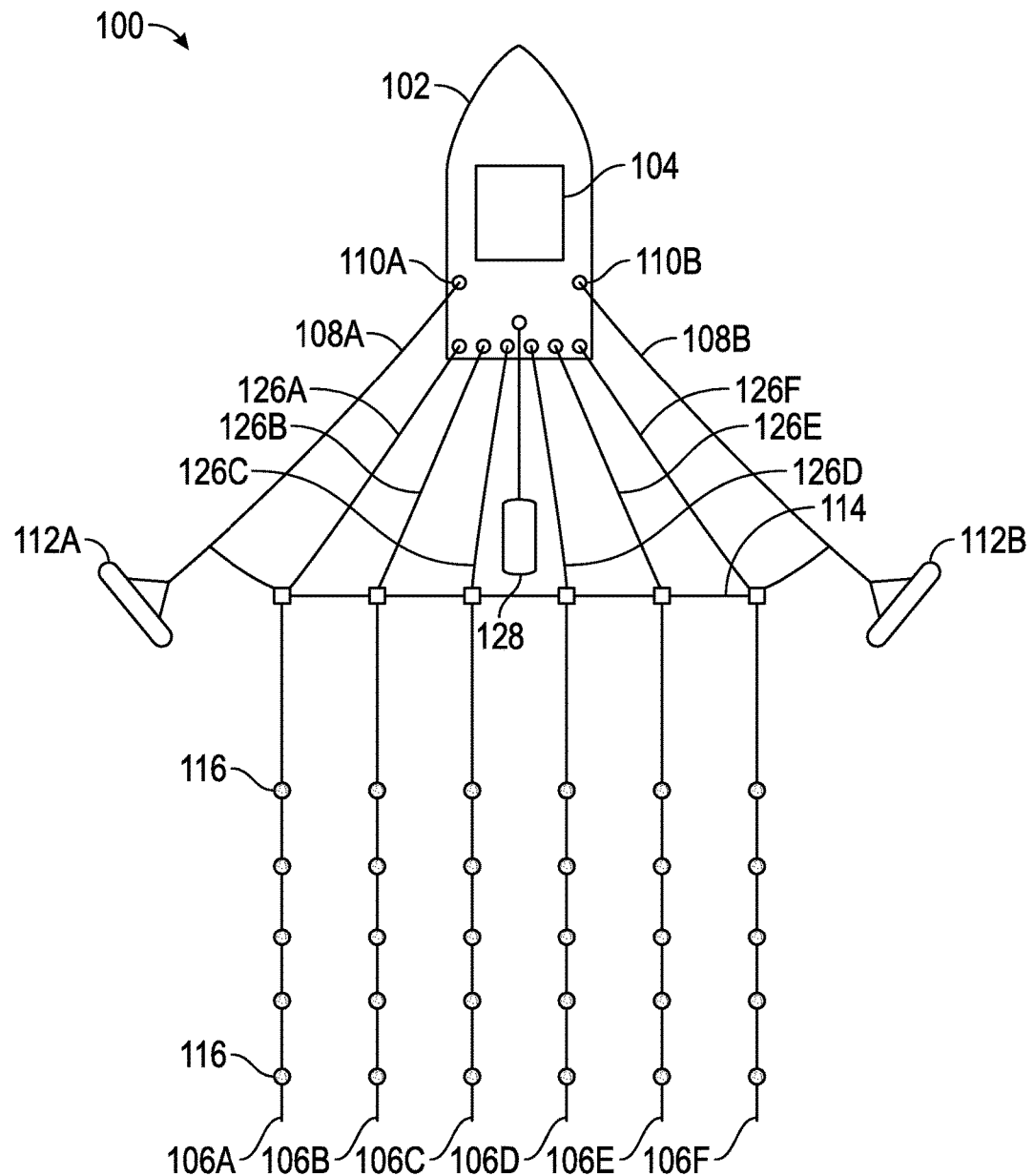
FIG. 1 shows an overhead view of a marine seismic survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Normal MoveOut correction" or just "NMO correction" on a Common Depth Point (CDP) gather shall mean adjusting time indices of data points of each trace to remove differences in travel time associated with source-to-sensor spacing relative to a zero-offset propagation time. It follows that "reverse NMO correction" shall mean adjusting time indices of data points of each trace to add differences in travel time associated with source-to-sensor spacing.

"Common Depth Point" or just "CDP" shall mean a real or assumed reflector of acoustic energy.

"Common Depth Point gather" or just "CDP gather" shall mean data comprising a plurality of traces in relation to a CDP, the CDP gather having one trace for each source-to-sensor spacing.

"Migration" shall mean correcting location of a CDP based on slope of a reflector of acoustic energy (such as a sea bed) followed by NMO correction based on the corrected location of the CDP.

"Trace" shall mean a series of data points (indexed against time) representing a response of a sensor to acoustic energy propagating in water impinging on the sensor.

"Sensor" shall mean a physical device that produces an output signal responsive to acoustic energy. Sensor shall include either: a single sensor device; or a plurality of sensor devices that act in concert to create the output signal.

"Zero-offset propagation time" shall mean a real or theoretical time for acoustic energy to propagate from a source to a common depth point and then to a sensor, where the source and sensor are co-located directly above the common depth point.

"Zero-offset trace" shall mean a real or theoretical trace associated with a zero-offset propagation time.

"Substantially the same", with respect to travel times, shall mean that the travel time of each trace is within one percent (1%) of the average of the travel times of all the traces.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various example embodiments are directed to correcting for differences in speed of sound in the water column. More particularly, example embodiments correct for changes in speed of sound by analyzing Common Depth Point (CDP) gathers in an image domain representation of the CDP gather, where the image domain representation may be created by performing migration using a reference velocity of sound in the water. More particularly still, example embodiments determine an estimated velocity that makes travel time in the image domain the same for each trace of a CDP gather, and based on the estimated velocity a zero-offset time shift is calculated in relation to the reference velocity. The zero-offset time shift is then added to each trace of a CDP gather in an image domain representation created using the estimated velocity, and thereafter the data is changed back to an arrival time domain. In this way, the "water column static" as between distinct 3D marine geophysical surveys is reduced or removed, thus making more accurate 4D surveying that builds on multiple 3D marine geophysical surveys. The specification first turns to an example marine geophysical survey system.

FIG. 1 shows an overhead view of a marine geophysical survey system 100 in accordance with at least some embodiments. In particular, FIG. 1 shows a survey vessel 102 having onboard equipment, herein referred to collectively as onboard recording system 104. The onboard recording system 104 may comprise navigation equipment, energy source control equipment, and data recording and data processing equipment. Survey vessel 102 may be configured to tow one or more sensor streamers 106A-F through the water. While FIG. 1 illustratively shows six sensor streamers 106, any number of sensor streamers 106 may be used.

The sensor streamers 106 are coupled to towing equipment that maintains the sensor streamers 106 at selected depth and lateral positions with respect to each other and with respect to the survey vessel 102. The towing equipment may comprise two paravane tow lines 108A and 108B each coupled to the survey vessel 102 by way of winches 110A and 110B, respectively. Paravanes 112A and 112B place into tension a spreader cable 114 which holds the proximal ends of the sensor streamers 106 in fixed lateral positions. Electrical and/or optical connections between appropriate components in the onboard recording system 104 and components of the sensor streamers 106, such as sensors 116, may be made using inner lead-in cables 126A-F.

In an acoustic or seismic survey, the sensors 116 may include one or more instruments such as hydrophones, geophones, and/or accelerometers to detect acoustic signals. The sensors 116 may be individual sensors, or groups of sensors in any suitable combination. The sensor streamers may also include elements for detecting signals as part of an electromagnetic survey.

Still referring to FIG. 1, the example marine geophysical survey system 100 may further include a source 128 towed behind the survey vessel 102 in relation to the sensor streamers 106A-106F. The source 128 may be an acoustic source of any suitable form, such as an air gun or air gun array, water gun, steam gun, or a marine vibrator. While source 128 is shown to be towed by the survey vessel 102 in FIG. 1, the source 128 may be towed by other vessels associated with the marine geophysical survey in operational relationship to the sensor streamers 106A-106F.

Figure 2:
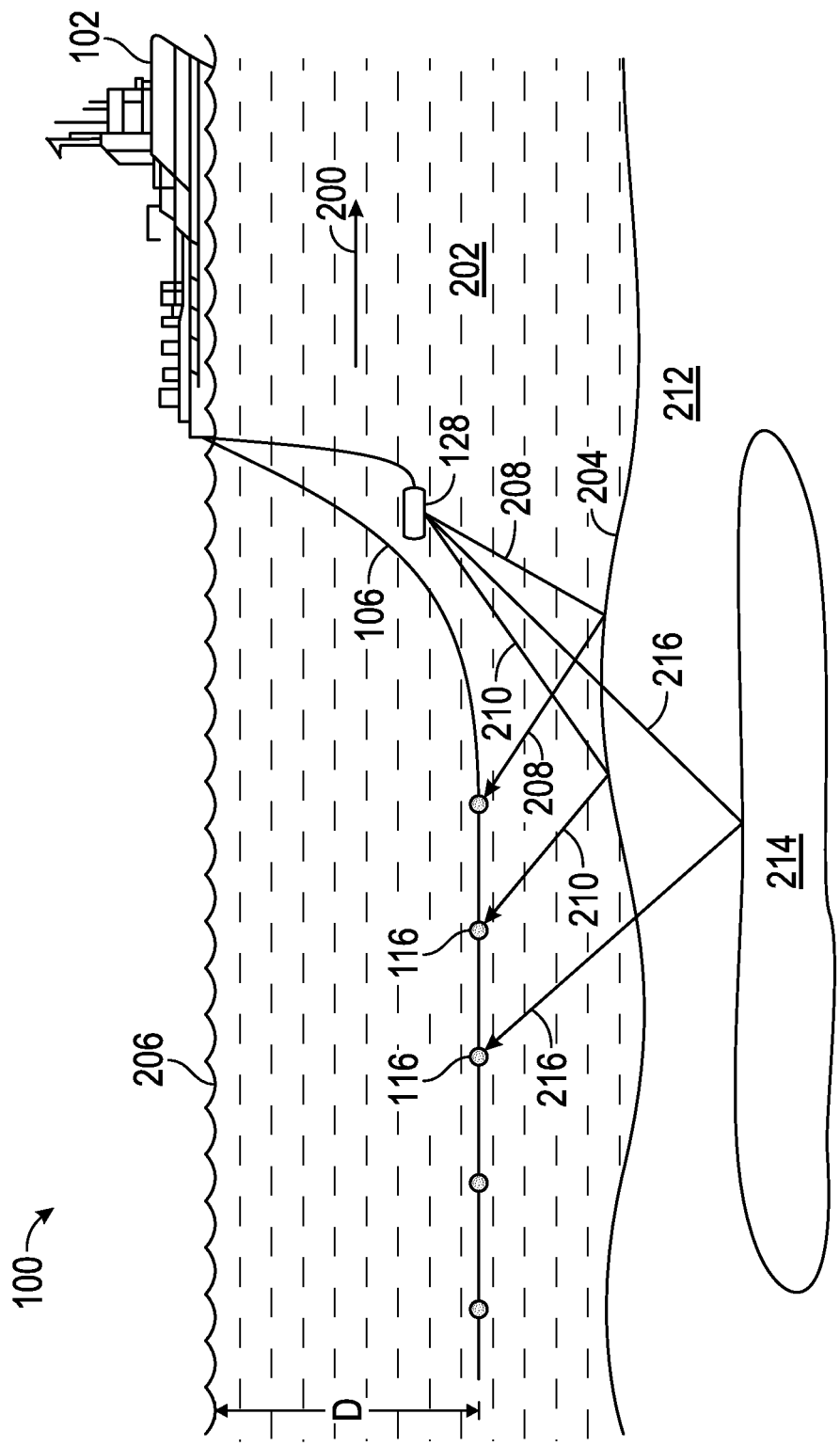
FIG. 2 shows a side elevation view of a marine seismic survey system in accordance with at least some embodiments.

FIG. 2 shows a side elevation view of marine geophysical survey system 100 in order to convey further concepts. In particular, FIG. 2 shows the survey vessel 102 towing sensor streamer 106 along a path of travel 200 within water body 202, which may be sea water. In FIG. 2, for ease of illustration, only a single sensor streamer 106 is shown; however, as described in conjunction with FIG. 1 a marine geophysical survey system 100 may include any number of sensor streamers. Sensor streamer 106 may be towed above the seabed 204 and below the surface 206 at a depth, D.

Source 128 periodically releases acoustic energy which propagates down to the sea bed 204. A portion of the acoustic energy reflects from the sea bed and is sensed by the sensors 116. Propagation of acoustic energy that reflects from the sea bed is illustrated for a few of the sensors 116 by arrows 208 and 210. However, other portions of the acoustic energy may propagate into the formation 212 beneath the sea bed 204 and reflect from a hydrocarbon bearing formation 214. The acoustic energy reflected from the hydrocarbon bearing formation 214 may likewise propagate upward again to be detected by various sensors 116. Propagation of acoustic energy that moves through the formation 212 and reflects from the hydrocarbon bearing formation 214 is illustrated by arrow 216. The situation shown in FIG. 2 is simplified for purposes of discussion. It will be understood that at each sharp contrast of propagation mediums with differing acoustic velocity (e.g., at the interface of the water body 202 and formation 212, the interface defined as the sea bed 204) a portion of the acoustic energy is reflected and another portion continues on. Thus, a portion of the downward travelling acoustic energy associated with arrow 216 reflects at the sea bed 204, but such is not shown in FIG. 2 so as not to unduly complicate the figure. Similarly, a portion of the downward travelling acoustic energy associated with arrow 208 continues into the formation 212, but such is not shown in FIG. 2 so as not to unduly complicate the figure. Moreover, the view of FIG. 2 represents a snapshot at a particular time (or a limited time span of a few seconds or less); however, in practice the survey vessel 102 travels along the path of travel 200 at certain speed (e.g., 1 to 5 knots) with the source 128 periodically activated. Thus, while the physical relationship between the source 128 and the sensor streamer 106 remains fixed, the location of the combined sensor streamer 106 and source 128 changes in relation to the sea bed 204 and the hydrocarbon bearing formation 214 over time. The specification now turns to an explanation of common depth point in relation to the example method.

Figure 3:
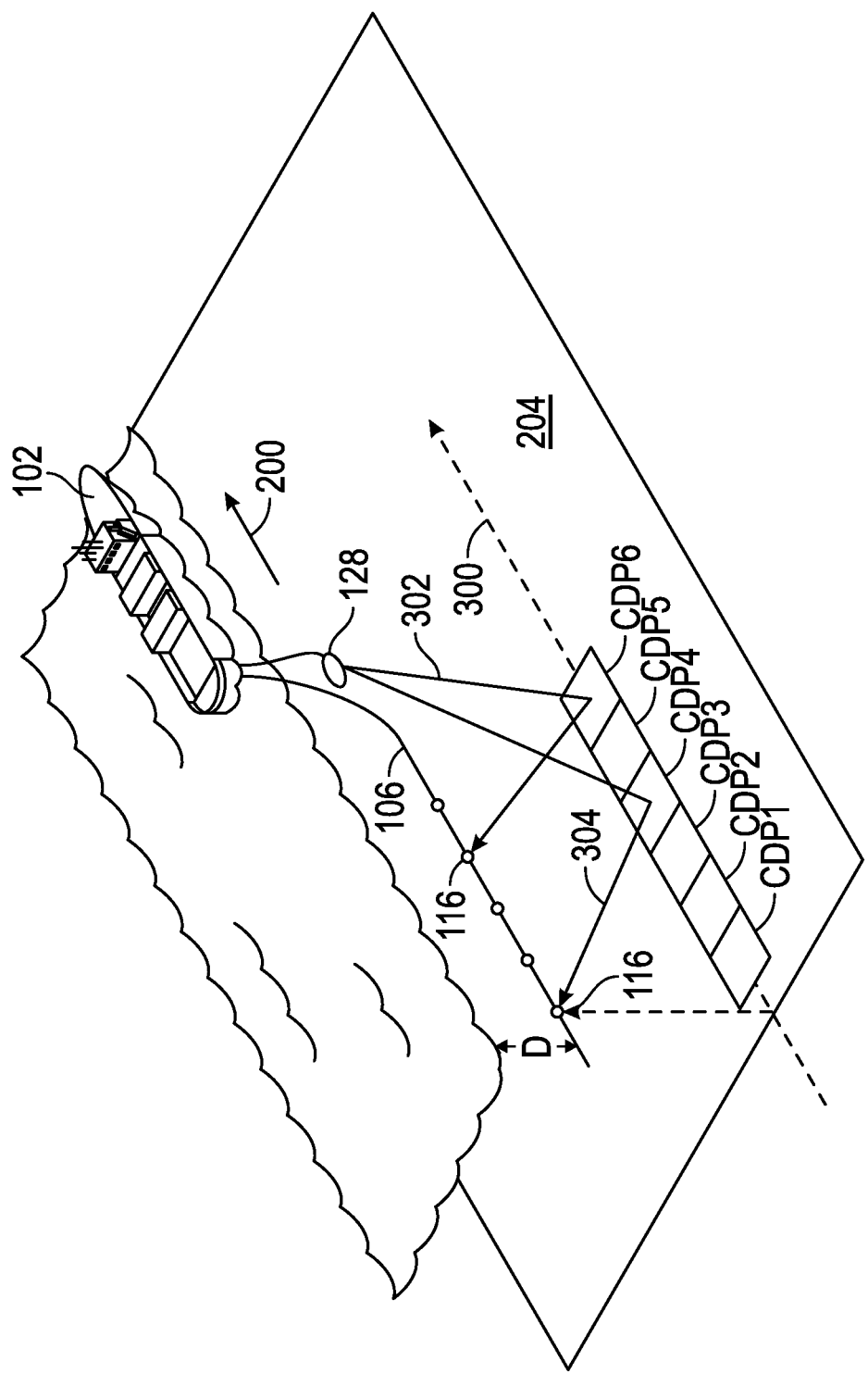
FIG. 3 shows a perspective view of a marine seismic survey system in accordance with at least some embodiments.

FIG. 3 shows a perspective cut-away view in accordance with an example system. In particular, FIG. 3 shows the survey vessel 102 towing a single sensor streamer 106 and source 128. FIG. 3 is limited to a single sensor streamer 106 so as not to unduly complicate the discussion of common depth points. In example systems, potential locations of acoustic reflectors (e.g., the sea bed 204) are conceptually divided into relatively small reflectors during data analysis. As shown, the sea bed 204 directly beneath the sensor streamer 106 along the path of travel 200 is conceptually divided into a plurality of reflection locations, each reflection location referred to as common depth point (CDP in the figure). The common depth points are a predetermined area (e.g., 12.5 meters (m) by 12.5 m, or about 156 m$^2$). The line of travel projected onto the acoustic reflectors may be referred to as the sail line 300, and thus the common depth points can be considered abutting areas along the sail line 300. In the example shown in FIG. 3, six common depth points are shown (CDP1 through CDP6), but the number of common depth points may reach many thousands along a sail line for a marine geophysical survey.

Each time the source 128 is activated (each activation sometimes referred to as a "shot") acoustic energy propagates down and reflects from many different reflectors, as discussed with respect to FIG. 2, including the sea bed 204 as shown in FIG. 3. Stated otherwise, each shot results in the sensors 116 receiving acoustic energy reflected from one or more acoustic reflectors, some of which may be considered common depth points in the data processing steps. In the example system of FIG. 3, a single shot from the source 128 results in each sensor 116 receiving acoustic energy reflected from the sea bed, such as illustrated by arrows 302 and 304. The specification now turns to a description of a CDP gather.

Figure 4A:
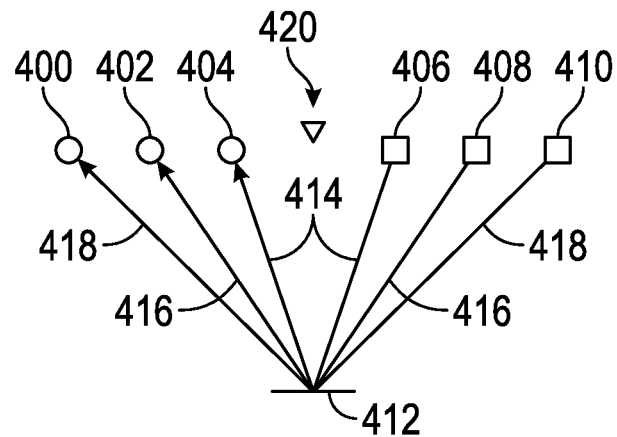
FIG. 4A shows a side elevation view of sensors and sources in accordance with at least some embodiments.

FIG. 4A shows a side elevation view of a set of sensor locations 400, 402, and 404 in relation to a set of source locations 406, 408, and 410 for a horizontal reflector, such as a horizontal area of sea bed. Moreover, FIG. 4A shows a physical relationship between the sensor locations, the source locations, and a common depth point 412 (the common depth point shown as a short line segment). While theoretically possible to have multiple sensors and multiple sources in the physical relationship shown in FIG. 4, in practice a single source may be used (or a group of sources simultaneously fired that act as a single source), and thus the source locations 406, 408, and 410 represent source locations of a single source for different shots triggered at different times as the source is towed through the water. Source location 406 and sensor location 404 correspond in relation to the common depth point 412, the correspondence shown by arrow 414. That is, taking into account that acoustic energy reflects such that the angle of incidence and the angle of reflection are equal (the angles measured against a line normal (i.e., perpendicular to) the reflector), in the physical relationship shown only a sensor at sensor location 404 will receive acoustic energy reflected from the common depth point 412. Similarly, source location 408 and sensor location 402 correspond in relation to the common depth point 412, the correspondence shown by arrow 416. Source location 410 and sensor location 400 correspond in relation to the common depth point 412, the correspondence as shown by arrow 418. Also shown in FIG. 4A is a zero-offset position 420 (shown by the inverted triangle), the zero-offset position being directly above the CDP 412. Referring briefly to FIG. 2, the physical relationship between the sensors 116 of the sensor streamer 106 and the source 128 are fixed in the example marine geophysical survey system 100, and returning to FIG. 4 it follows sensor locations 400, 402, and 404 do not correspond to the same sensor 116 along a sensor streamer 106; but instead, sensor locations 400, 402, and 404 correspond to different sensors at different physical distances along the sensor streamer 106.

Figure 5:
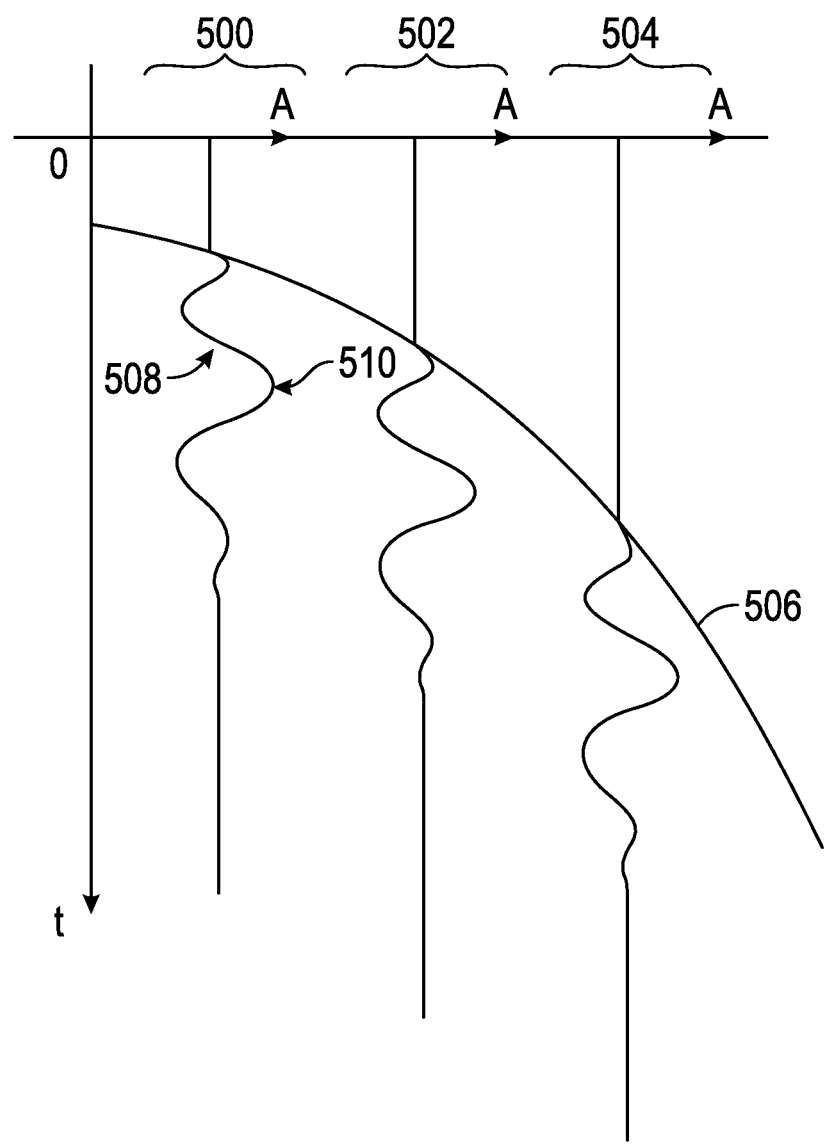
FIG. 5 shows a set of plots of detected acoustic energy in accordance with at least some embodiments.

In example systems, the onboard recording system 104 records indications of acoustic energy detected at each sensor 116 in relation to a respective shot performed by the source 128. FIG. 5 shows a set of co-plotted waveforms or traces for sensors at locations 400, 402, and 404 in relation to respective shot times, with the absolute time of each respective shot representing time zero for that trace. More specifically, FIG. 5 shows a time axis with time increasing down the page. Trace 500 represents the acoustic signal received by a sensor at location 404 with respect to a shot when the source 128 was at source location 406. Trace 502 represents the acoustic signal received by a sensor at location 402 with respect to a shot when the source 128 was at source location 408. Trace 504 represents the acoustic signal received by a sensor at location 400 with respect to a shot when the source 128 was at source location 410. In early days of marine geophysical surveying, the onboard recording system 104 may have recorded the traces in analog format; however, in example systems the traces are digitized either by devices in the sensor streamers 106, or within the onboard recording system 104, and thus the traces are stored in digital format with each individual value indexed directly or indirectly against a time value.

Because of the distance between respective sensor locations and source locations, and taking into account the velocity of acoustic energy in water, the amount of time for the acoustic energy to propagate from a source location to the common depth point, and then from the common depth point to a sensor location is a function of the distance of propagation and the acoustic velocity in the water. Thus, and as shown, the first arrival of acoustic energy in trace 500 (associated sensor location 404 and source location 406) occurs in less time than the first arrival of acoustic energy in trace 502 (associated with sensor location 402 and source location 408). Similarly, the first arrival of acoustic energy in trace 502 (associated sensor location 402 and source location 408) occurs in less time than the first arrival of acoustic energy shown in trace 504 (associated with sensor location 400 and source location 410).

Though simplified for purposes of discussion, FIGS. 4A and 5 illustrate the concept of a CDP gather. That is, the traces 500, 502, and 504 represent a set of data (a gather) in relation to a single common depth point (and thus a CDP gather), there being one trace with respect to each source-to-sensor spacing within the gather. In practice, each CDP gather may have many hundreds or thousands of member traces, but the concepts introduced in FIGS. 4A and 5 scale directly to any number of traces for a single common depth point. Moreover in practice the traces may be plotted in a three-dimensional view (e.g., with the positive amplitude projecting "out of the page") and with the co-plotted traces almost abutting. Nevertheless, information of a CDP gather may be of data in the form of traces.

In order to facilitate later discussion, FIG. 5 further includes a curve 506 fitted through a common feature of each trace 500, 502, and 504. In the example shown in FIG. 5, the curve 506 is fitted through points of first movement of the traces 500, 502, and 504. The selection of first movement as the point of interest in each trace is merely an example, and any consistent feature of the traces may be selected. For example, a line could be fitted based on the second zero crossing in each trace, such as zero crossing 508 in trace 500, or the second positive peak in each trace, such as peak 510 in trace 500. Regardless of the point selected, the curve 506 visually represents differences in propagation time associated with acoustic velocity in water and distances between the sensor locations and source locations.

Figure 4B:
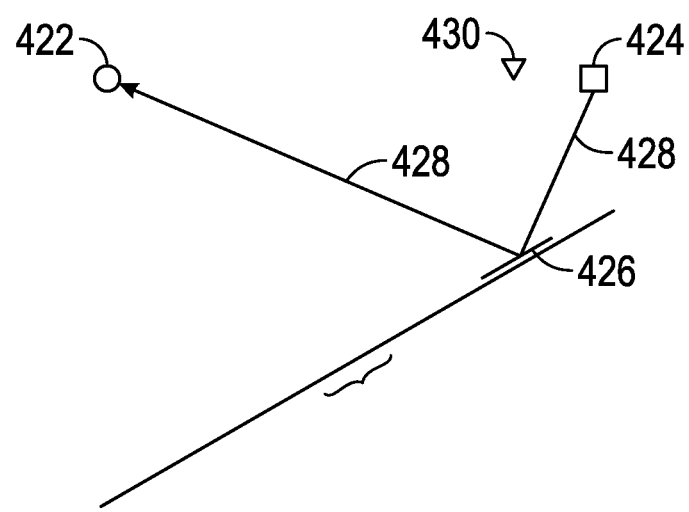
FIG. 4B shows a side elevation view of a sensor and a source in accordance with at least some embodiments.

FIG. 4A represents a case where the reflector in the form of the sea bed is substantially horizontal. In the situation illustrated by FIG. 4A, the CDP is at the mid-point between the sources and receivers, and thus the zero-offset position 420 is likewise at the midpoint between the sources and receivers. In some cases, however, the reflector is not horizontal, and in such cases adjustments may be needed to the location of a CDP for a CDP gather. FIG. 4B shows a side elevation view of a sensor location 422 in relation to source locations 424 for a sloped reflector, such as a sloped sea bed. Moreover, FIG. 4B shows a physical relationship between the sensor location, the source location, and a common depth point 426 (the common depth point shown as a short line segment). Source location 424 and sensor location 422 correspond in relation to the common depth point 426, the correspondence shown by arrow 428. Also shown in FIG. 4B is a zero-offset position 430 (shown by the inverted triangle), the zero-offset position being directly above the common depth point 426.

Unlike the case of FIG. 4A where the common depth point is at the midpoint, in the case of a sloped reflector the common depth point is actually at a location up the slope. Thus, in cases where reflector is sloped, an initial step may involve adjusting location of one or more of the common depth points to account for slope of the sea bed.

In example embodiments, correcting for water column static first involves performing migration on the data. Migration involves adjusting location of one or more of the common depth points to account for slope of the sea bed, and then performing the Normal MoveOut (NMO) correction. Thus, in the example systems, a migration is performed on a CDP gather using an assumed or reference velocity of acoustic energy in the water. In cases where the sea bottom is substantially horizontal, adjusting location to account for slope may be omitted, and instead the method may move directly to NMO correction. From this point forward, the specification will refer to just NMO correction with the understanding that for sloped reflectors a full migration may be performed. NMO correction refers to adjusting time indices of data points of each trace of a CDP gather to remove differences in travel time associated with source-to-sensor spacing relative to a zero-offset propagation time. A zero-offset propagation time is a time for acoustic energy to propagate from a source to a common depth point and then to a sensor, where the source and sensor are co-located directly above the common depth point. Referring again briefly to FIGS. 4A and 4B, a zero-offset position 420 is illustrated in FIG. 4A by the inverted triangle, and likewise a zero-offset position 430 is illustrated in FIG. 4B by the inverted triangle. In many cases, however, no source and/or sensor are co-located directly above the common depth point, and thus the zero-offset propagation time is a calculated value based on the reference velocity and the mathematically determinable distance of the zero-offset position above the common depth point.

Performing NMO correction on a CDP gather involves calculating the zero-offset travel time (using the reference velocity), determining a difference between the actual travel time and the calculated zero-offset travel time, and then subtracting the difference from the actual travel times for each data point in a trace. Given that the offset and actual travel time are different for each trace (i.e., different for each source-to-sensor spacing), NMO correction is performed on a per trace basis within a CDP gather, though the zero-offset travel time and reference velocity will be the same for each trace.

Figure 6:
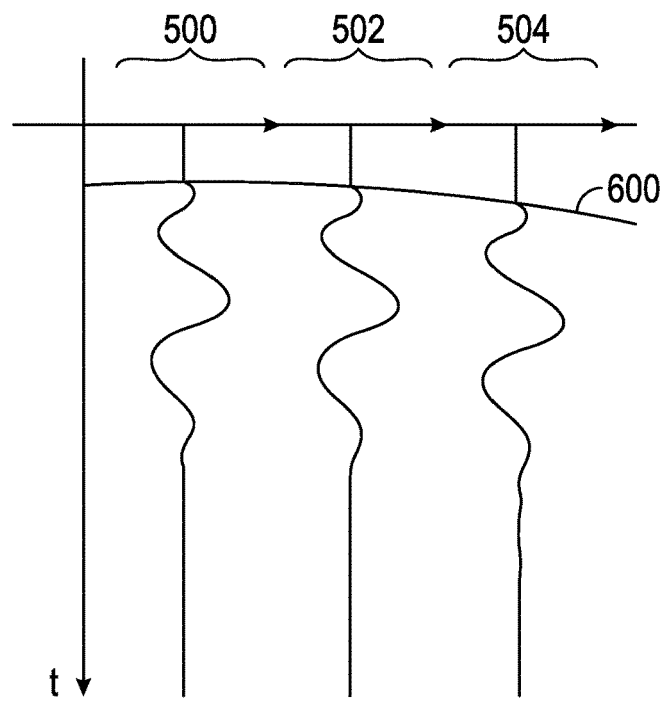
FIG. 6 shows a set of plots of detected acoustic energy after NMO correction in accordance with at least some embodiments.

FIG. 6 shows co-plotted traces of FIG. 5 after NMO correction. More specifically, FIG. 6 shows the CDP gather comprising traces 500, 502, and 504 after NMO correction based on a reference velocity. FIG. 6 further shows a curve 600 fitted through a common feature of each trace 500, 502, and 504, with the common feature in this example again being first movement within the trace. Thus, FIG. 6 is representative of NMO data comprising a plurality of traces, and may be considered an "image domain" version of the CDP gather; whereas, the CDP gather visually shown in FIG. 5 is representative of an "arrival time domain." If the reference velocity used in performing the NMO correction on the example CDP gather correctly reflects the actual acoustic velocity in the water at the time the marine geophysical survey was performed, then the curve 600 would be a straight line. However, curve 600 defining something other than a straight line may be an indication that the actual acoustic velocity in the water at the time of the marine geophysical survey was different than the reference velocity. Thus, FIG. 6 shows an example situation where the reference velocity used in the NMO correction was different than the actual water velocity in the water at the time of the marine geophysical survey.

Figure 7:
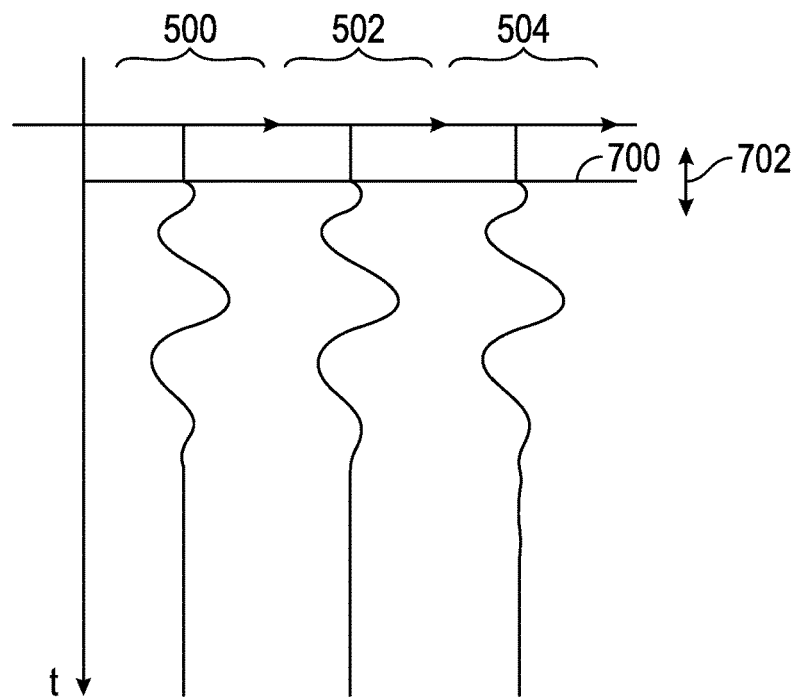
FIG. 7 shows a set of plots of detected acoustic energy after NMO correction in accordance with at least some embodiments.

The next step in the example embodiments is to select an estimated velocity that makes the travel time represented in the NMO data (the NMO data being the result of the initial NMO correction) the same. Visually, the next step in the example embodiments is to select an estimated velocity that makes the curve 600 of FIG. 6 a straight line, such as line 700 shown in FIG. 7. Many factors may make finding a single estimated velocity which results in line 700 improbable. On the physical side during the marine geophysical survey, water currents, differential heating from the sun, and salinity differences (to name a few) may exist over a time span of a CDP gather, and thus there may not be a single estimated velocity that makes the travel times exactly the same. Moreover, while the physical location of sensor streamers in the water may be known with relatively high precision, small positional errors may be present. Similarly on the data processing side, computer systems split processor time among many different tasks, and even a single conceptual task may be spilt among several simultaneously executed threads within the processor. The point is, recording the shot time and/or recording the arrival time of an acoustic signal is subject to a certain amount of inherent variability. Still on the data processing side, selecting a common feature point as between traces is subject to variability based on a variety of factors, such as the noise content in the traces. Finally, computers perform calculations with high but finite precision, and thus rounding errors may be present in some or all calculations and determinations.

Thus, in example systems an estimated velocity is selected that makes the travel time represented in the traces substantially the same, where "substantially the same" means that the travel time of each trace is within one percent (1%) of the average of the travel times of all the traces. Once an estimated velocity is determined as described above, the next example step involves calculating a zero-offset time shift that represents the difference in travel time as between the reference velocity and the estimated velocity at a zero-offset trace. In accordance with example systems, the zero-offset time shift may be calculated using the following equation:

$$\Delta t = 2 \times Z_{WB} \times \left( \frac{1}{v_{ref}} - \frac{1}{v_{est}} \right) \qquad (1)$$

where $\Delta t$ is the zero-offset time shift in seconds, $Z_{WB}$ is the depth of the water bottom in meters along at least a portion of a common depth point associated with the CDP gather, $v_{ref}$ is a reference water velocity in meters per second, and $v_{est}$ is the estimated velocity in meters per second.

Summarizing before continuing, for the CDP gather upon which initial migration is performed, an estimated velocity is calculated and/or selected such that the estimated velocity makes the travel time of each trace of an NMO correction the substantially the same. Thereafter, a zero-offset time shift is calculated. For 3D marine geophysical survey data to be directly comparable to 3D marine geophysical data taken in different surveys, each set of 3D marine geophysical survey data may need to be analyzed with respect to a uniform reference velocity regardless of the actual acoustic velocity of the water at the time of the respective surveys.

Thus, conceptually, the next step in the example embodiments is to correct the CDP gather to a model situation based on a reference velocity (which reference velocity may be used in the initial NMO correction discussed above).

More specifically then, correcting the CDP gather to the model situation may involve performing a second NMO correction on the CDP gather, but the second NMO correction is performed using the estimated velocity and the second NMO correction is not preceded by adjusting to account for slope of the reflector. Stated otherwise, the second NMO correction is not part of a migration, but is a stand-alone NMO correction. The second NMO correction using the estimated velocity is performed, and the second NMO correction generates second NMO data, which second NMO data is visually shown in FIG. 7.

The next example step in correcting the CDP gather to the model situation may be accomplished by adding the zero-offset time shift, as calculated above in reference to equation (1), to the traces of the second NMO data. It is noted that the zero-offset time shift as calculated according to equation (1) can be either a positive or negative value, and thus "adding" the zero-offset time shift can result in shifting of the traces either closer to, or farther from, zero point of each trace. Adding the zero-offset time shift to each trace visually results in the location of line 700 of FIG. 7 shifting up or down, as illustrated by double-headed arrow 702. Adding the zero-offset time shift to each trace can take many forms depending upon how the data of each trace is stored. If each data point in a trace has both an amplitude and a time reference, then adding the zero-offset time shift involves adding the value of the zero-offset time shift to each time reference. In other cases, the traces may have single time value (e.g., representing the shot time), and a plurality of amplitude values without accompanying time reference, where the time span between each amplitude value is assumed to be a constant. In such a variation, adding the value of the zero-offset time shift may involve adding the value of the zero-offset time shift to the single time value. Other variations of adding the zero offset time shift to each trace are possible depending on the storage technique of the underlying amplitude data.

Once the zero-offset time shift is added to the second NMO data, the example embodiments perform reverse NMO correction (using the estimated velocity) to recover the CDP gather; however, the CDP gather after the reverse NMO correction represents data based on or referenced against the reference velocity, the corrected CDP gather sometimes referred to as corrected data. In this way a CDP gather can be directly compared to CDP gathers based on marine geophysical surveys taken earlier or later in time (which also have data referenced against the reference velocity). In some cases, analysis of the corrected data may indicate action to be taken. For example, if the multiple sets of corrected data of a hydrocarbon producing reservoir are analyzed (as part of the 4D marine seismic survey), the data analysis may indicate that the extraction techniques for the hydrocarbon producing reservoir need changing or adjustment. For example, the rate of extraction from one or more wells may need changing or adjustment to achieve uniform extraction. As another example, secondary recovery fluid injection rate may need to be changed to achieve uniform extraction. In some cases, the changing of extraction technique may be drilling of additional extraction or secondary recovery injection wells.

The specification to this point has described the example embodiments in terms of a single CDP gather corrected to be referenced against the model situation based on the reference velocity. It is possible that example embodiments can be performed standing alone with reference to a single CDP gather; however, in other cases, the correction of CDP gathers to the model situation based on the reference velocity may be performed taking into account several CDP gathers from the same marine geophysical survey. More specifically, in example embodiments selecting an estimated velocity upon which to base a calculation of zero-offset time shift (that is, a final estimated velocity) may be based on estimated velocity from several CDP gathers along a single sail line. In particular, consider that the description to this point was with respect to a first CDP gather for a first common depth point along a sail line (such as CDP1 of FIG. 3). Now consider that the example embodiment is performed multiple times with respect to several additional CDP gathers for a respective several additional common depth points along the same sail line (such as CDP2 through CDP6 of FIG. 3).

In the situation of performing the example embodiment along several CDP gathers, for each CDP gather the initial migration or stand-alone NMO correction may be performed using the reference velocity to create NMO data, and for each set of NMO data an estimated velocity is determined. However, selecting the final estimated velocity (for use in calculating the zero-offset time shift) may be based on the estimated velocity associated with each NMO data. More specifically, in these example embodiments the final estimated velocity is selected by filtering a representation of the estimated velocity for each set of NMO data.

Figure 8:
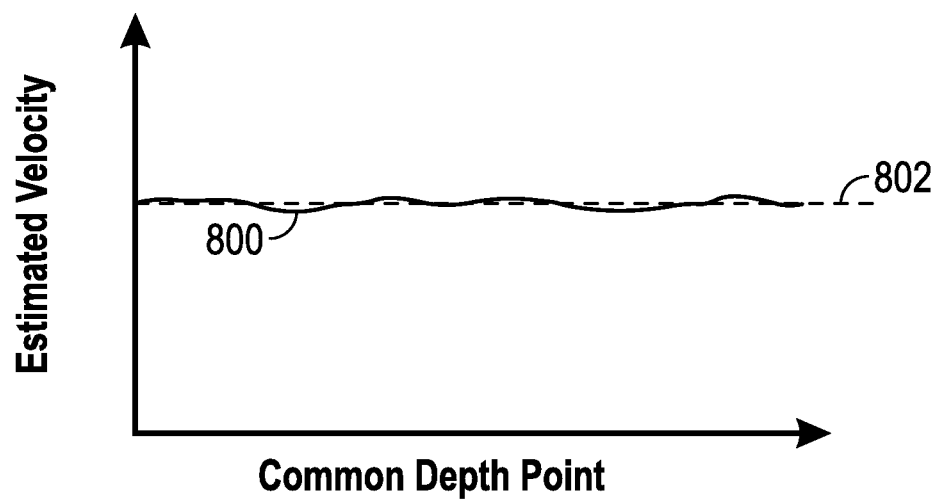
FIG. 8 shows a plots of estimated velocities as a function of common depth point in accordance with at least some embodiments.

FIG. 8 shows a plot of estimated velocity for each common depth point. In particular, FIG. 8 shows estimated velocity along the y-axis against common depth point along the x-axis. The line 800 can be thought of as individual estimated velocity values connected together to form line 800. FIG. 8 shows that, in spite of CDP gathers being from the same marine geophysical survey, and indeed CDP gathers associated with the abutting common depth points along a sail line as in FIG. 3, the uncertainties noted above (e.g., variations in salinity, positional error of components of the survey, variations in time stamping, and variations in selecting common features across different traces) may result in different estimated velocities used to make travel time within NMO data substantially the same. The differences in the estimated velocities between each common depth point manifest themselves as high frequency noise in the representation of FIG. 8.

In these example embodiments, selecting a final estimated velocity (to be used in calculating the zero-offset time shift) may be made by filtering the estimated velocity data. In some cases, filtering may involve high pass filtering the data to remove the high frequency noise, resulting in a more stable and constant estimated velocity, such as the dashed line 802 in FIG. 8. Regardless of the method of selecting the final estimated velocity, using estimated velocity associated with the several CDP gathers along a sail line may result in a better final estimated velocity. Thus, with the final estimated velocity a zero-offset time shift may be calculated according to equation (2) above. With the final estimated velocity selected according these example embodiments, NMO correction on each CDP gather based on the final estimated velocity may be performed, the zero-offset time shift added to the each trace of each NMO data, and then reverse NMO correction performed.

Figure 9:
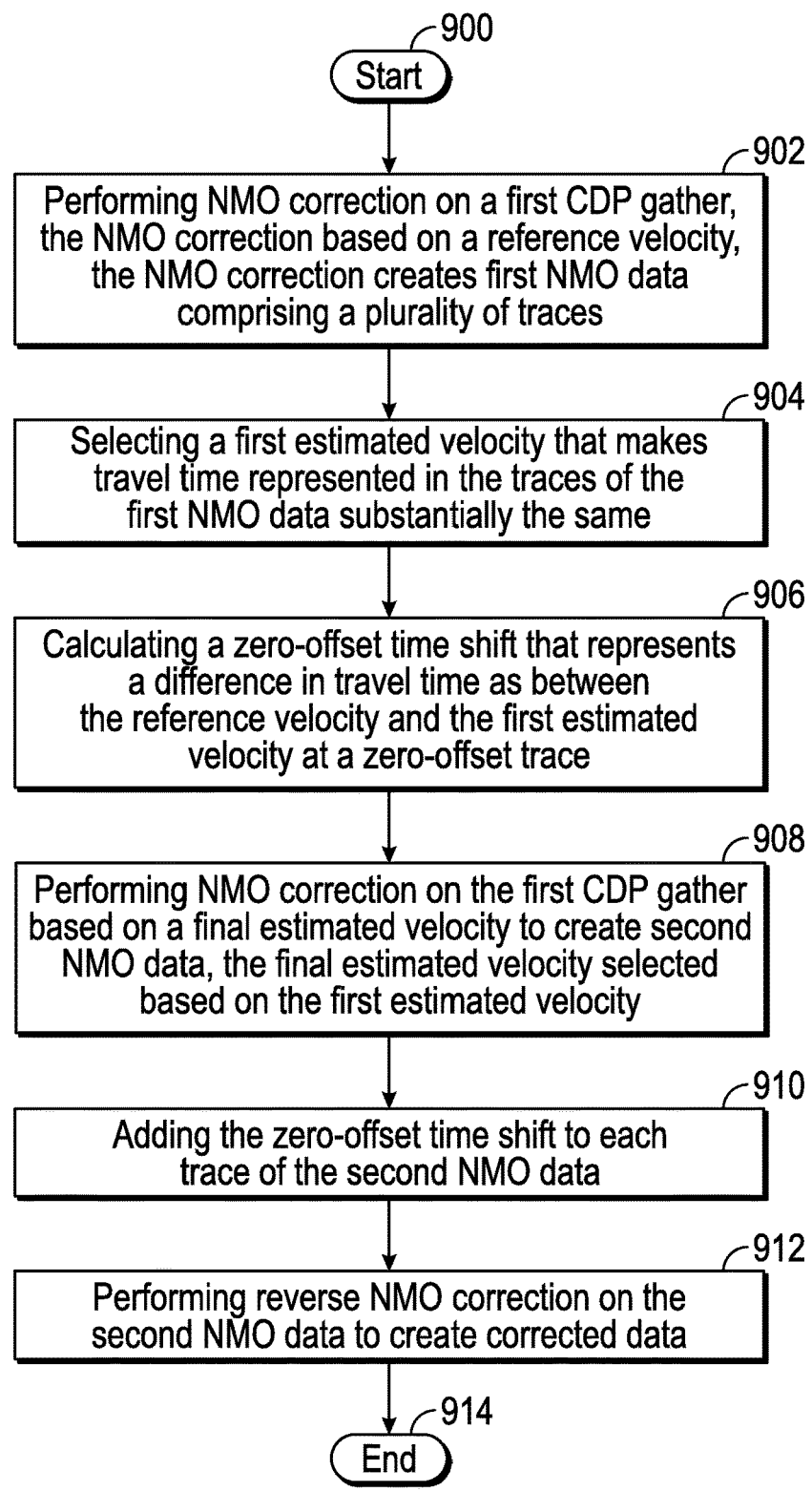
FIG. 9 shows a method in accordance with at least some embodiments.

FIG. 9 show a method in accordance with an example embodiment. In particular, the method starts (block 900) and comprises: performing NMO correction on a first CDP gather, the NMO correction based on a reference velocity, the NMO correction creates first NMO data comprising a plurality of traces (block 902); selecting a first estimated velocity that makes travel time represented in the traces of the first NMO data substantially the same (block 904); calculating a zero-offset time shift that represents a difference in travel time as between the reference velocity and the first estimated velocity at a zero-offset trace (block 906); performing NMO correction on the first CDP gather based on a final estimated velocity to create second NMO data, the final estimated velocity selected based on the first estimated velocity (block 908); adding the zero-offset time shift to each trace of the second NMO data (block 910); and performing reverse NMO correction on the second NMO data to create corrected data (block 912). Thereafter the method ends (block 914).

Figure 10:
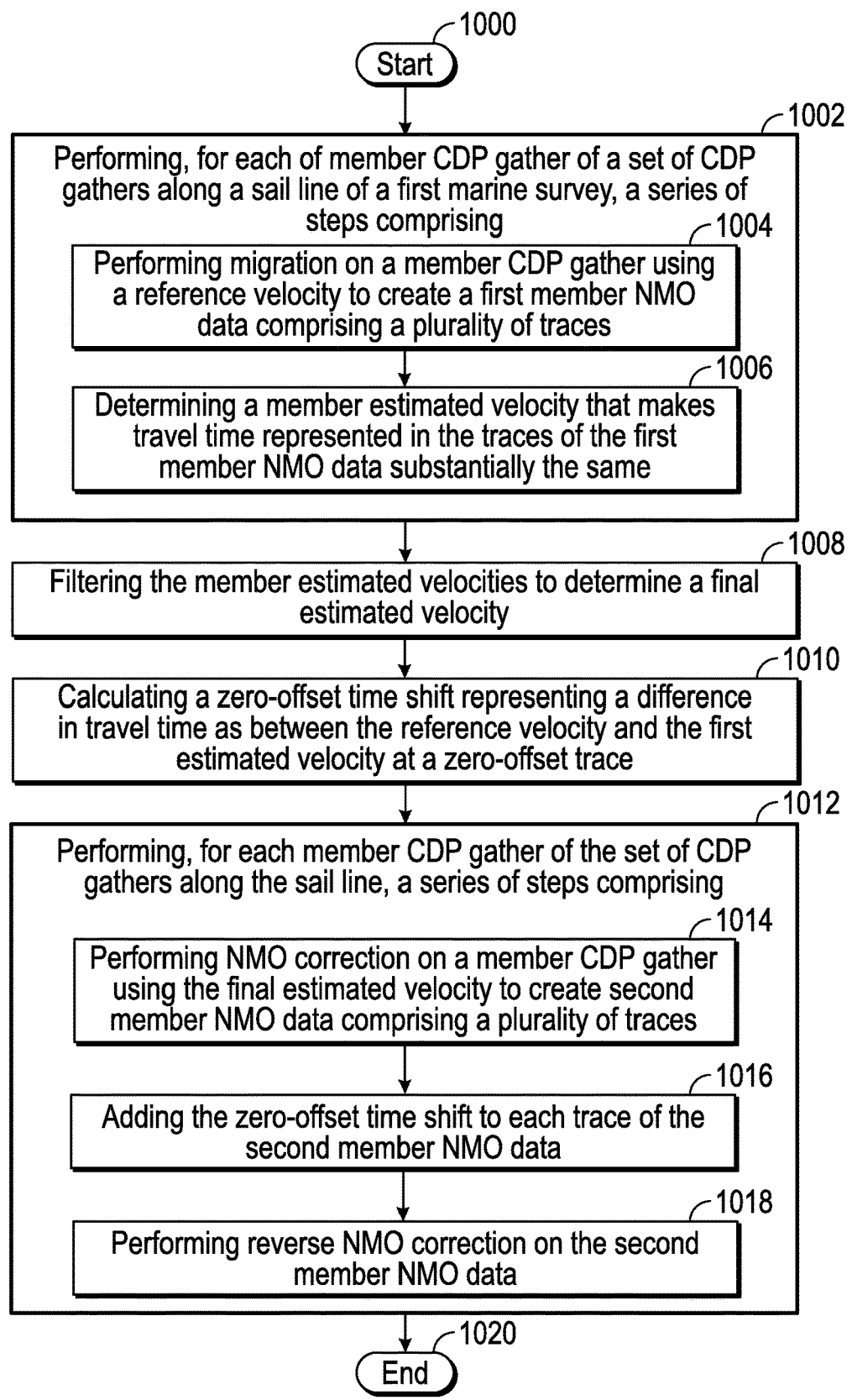
FIG. 10 shows a method in accordance with at least some embodiments.

The method shown in FIG. 9 is in reference to a single CDP gather. However, FIG. 10 shows a method in relation to a plurality of CDP gathers along a sail line of a marine geophysical survey. The plurality of CDP gathers as a group may be referred to as a "set of CDP gathers", and each CDP gather in the set is referred to as a "member CDP gather." Stated otherwise, a plurality of member CDP gathers makes a set of CDP gathers. It follows performing NMO correction on a member CDP gather results in member NMO data, and an estimated velocity to make the travel times within a member NMO data substantially the same is a "member estimated velocity." With the terminology established, in particular FIG. 10 starts (block 1000) and proceeds to performing, for each member CDP gather of a set of CDP gathers along a sail line of a first marine survey, a series of steps (block 1002). The series of steps may comprise: performing migration on a member CDP gather using a reference velocity to create a first member NMO data comprising a plurality of traces (block 1004); and determining a member estimated velocity that makes travel time represented in the traces of the first member NMO data substantially the same (block 1006). From there, the example method comprises: filtering the member estimated velocities to determine a final estimated velocity (block 1008); and calculating a zero-offset time shift representing a difference in travel time as between the reference velocity and the first estimated velocity at a zero-offset trace (block 1010). With the final estimated velocity determined and the zero-offset time shift calculated, the method proceeds to performing, for each member CDP gather of the set of CDP gathers along the sail line, a series of steps (block 1012). The series of steps may comprise: performing NMO correction on a member CDP gather using the final estimated velocity to create second member NMO data comprising a plurality of traces (block 1014); adding the zero-offset time shift to each trace of the second member NMO data (block 1016); and performing reverse NMO correction on the second member NMO data (block 1018). Thereafter, the method ends (block 1020).

Figure 11:
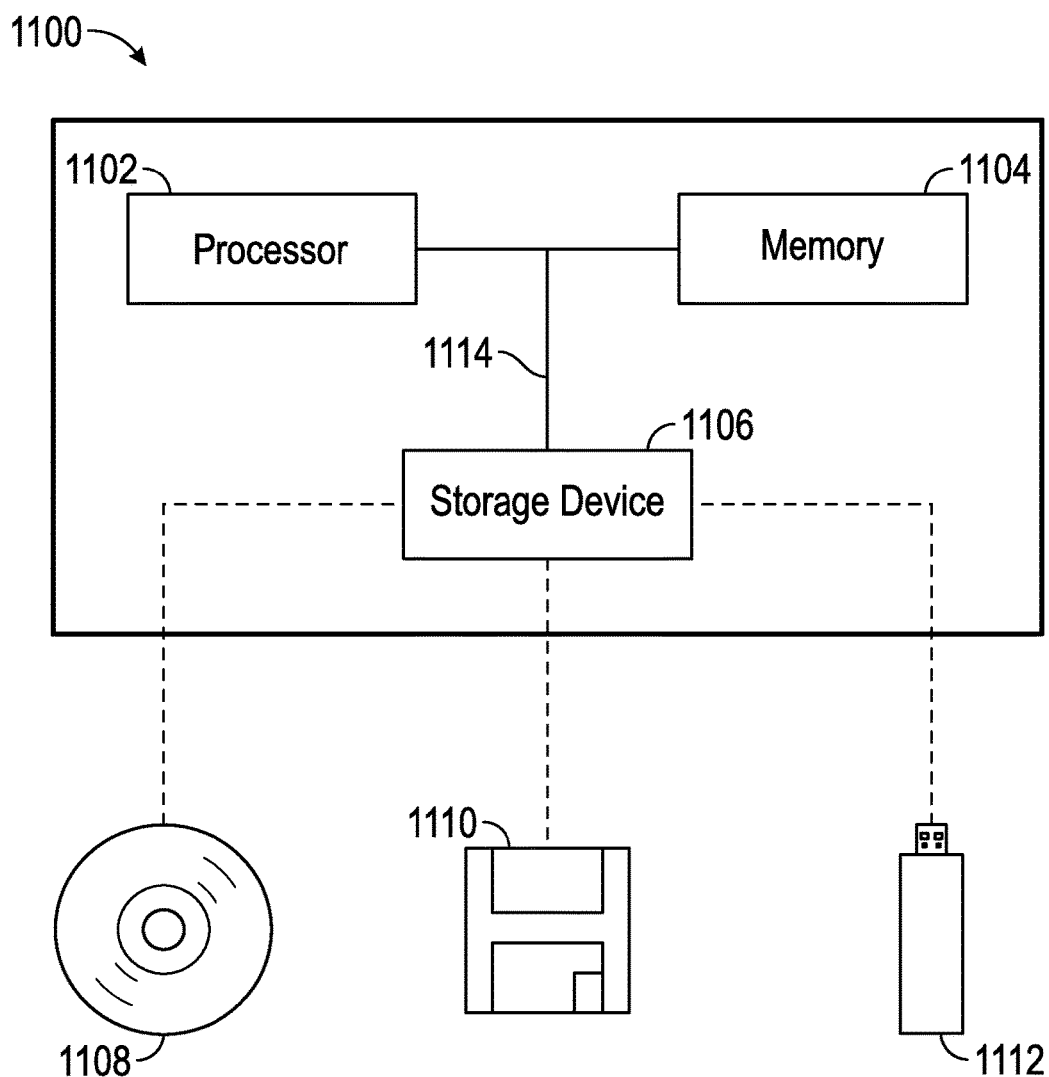
FIG. 11 shows a computer system in accordance with at least some embodiments.

FIG. 11 shows a computer system 1100 in accordance with at least some embodiments. The computer system 1100 is an example of: a computer system upon which portions of the example methods discussed could be performed; a computer system that forms a part or all of the systems described; or a computer system that creates the geophysical data product. The example computer system 1100 comprises a processor 1102 coupled to a memory 1104 and a storage system or long term storage device 1106. The processor 1102 may be any currently available or after-developed processor, or group of processors. The memory 1104 may be random access memory (RAM) which forms the working memory for the processor 1102. In some cases, data and programs may be copied from the storage device 1106 to the memory 1104 as part of the operation of the computer system 1100.

The long term storage device 1106 is a device or devices that implement non-volatile long-term storage, which may also be referred to as a non-transitory computer-readable media. In some cases, the long term storage device is a hard drive or solid state drive, but other examples include optical discs 1108, "floppy" disks 1110, and flash memory devices 1112. The various programs used to implement the programmatic aspects may thus be stored on the long term storage device 1106, and executed by the processor 1102. Relatedly, corrected CDP gathers may be calculated by the processor 1102 and communicated to the storage device 1106 (including the example optical disc 1108, floppy disk 1110, or flash memory device 1112) by way of a telemetry channel 1114 to become a geophysical data product.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

In accordance with an example embodiment, a geophysical data product may be produced. The data product may be produced by obtaining the data, such as by performing a geophysical survey, or by accessing data from a previous geophysical survey. The geophysical data product may include geophysical data processed in accordance with the description herein and may be stored on a non-transitory, tangible computer-readable medium. The geophysical data product may be produced offshore (i.e., by equipment on a vessel) or onshore (i.e., at a facility on land) either within the United States or in another country. If the geophysical data product is produced offshore or in another country, it may be imported onshore to a facility in the United States. Once onshore in the United States, geophysical analysis may be performed on the geophysical data product.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method of preparing Common Depth Point (CDP) gathers by: performing, by a computer system, Normal MoveOut (NMO) correction on a first Common Depth Point (CDP) gather, the NMO correction based on a reference velocity, the NMO correction creates first NMO data comprising a plurality of traces; calculating, by the computer system, a zero-offset time shift based on the reference velocity; adding, by the computer system, the zero-offset time shift to each trace of the first NMO data; and then performing, by the computer system, reverse NMO correction on the first NMO data; and wherein the improvement comprises:

selecting, by the computer system, a first estimated velocity that makes travel time represented in the traces of the first NMO data substantially the same;

performing, by the computer system, NMO correction on the first CDP gather based on a final estimated velocity to create second NMO data, the final estimated velocity selected based on the first estimated velocity;

wherein calculating the zero-offset time shift further comprises calculating, by the computer system, the zero offset time shift that represents a difference in travel time as between the reference velocity and the first estimated velocity at a zero-offset trace;

wherein adding the zero offset time shift further comprises adding, by the computer system, the zero-offset time shift to each trace of the second NMO data; and wherein performing reverse NMO correction further comprises performing, by the computer system, reverse NMO correction on the second NMO data to create first corrected CDP gather;

thereby adjusting the first CDP gather to the reference velocity compensated for variances in speed of sound in the water during collection of the first CDP gather with respect to the reference velocity.

2. The computer-implemented method of claim 1 further comprising, prior to performing NMO correction on the first CDP gather, adjusting location of a common depth point used for the first CDP gather, the adjusting to account for slope of the sea bed.

3. The computer-implemented method of claim 1 of preparing CDP gathers by: performing Normal MoveOut (NMO) correction on a second CDP gather, the NMO correction based on the reference velocity, the NMO correction creates third NMO data comprising a plurality of traces, and the second CDP gather along a sail line that includes the first CDP gather; calculating a second zero-offset time shift based on the reference velocity for the second CDP gather; adding the zero-offset time shift to each trace of the third NMO data; and then performing reverse NMO correction on the third NMO data; wherein the improvement comprises:

selecting, by the computer system, a second estimated velocity that makes travel time represented in the traces of the third NMO data substantially the same;

selecting the final estimated velocity based on the first and second estimated velocity;

performing, by the computer system, NMO correction on the second CDP gather based on the final estimated velocity to create fourth NMO data;

wherein calculating the second zero-offset time shift further comprises calculating, by the computer system, the second zero offset time shift that represents a difference in travel time as between the reference velocity and the second estimated velocity at a zero-offset trace for the second CDP gather;

wherein adding the second zero offset time shift further comprises adding, by the computer system, the second zero-offset time shift to each trace of the fourth NMO data; and wherein performing reverse NMO correction regarding the second CDP gather further comprises performing, by the computer system, reverse NMO on the fourth NMO data to create the second corrected CDP gather; and thereby adjusting the second CDP gather to the reference velocity compensated for variances in speed of sound in the water during collection of the second CDP gather with respect to the reference velocity.

4. The computer-implemented method of claim 3 further comprising, prior to performing NMO correction on the second CDP gather based on the final estimated velocity, adjusting location of a common depth point used for the second CDP gather, the adjusting to account for slope of the sea bed.

5. The computer-implemented method of claim 3 wherein selecting the final estimated velocity further comprises filtering a representation of the first and second estimated velocities to create the final estimated velocity.

6. The computer-implemented method of claim 3 further comprising:

analyzing the first corrected CDP gather against data against the second corrected CDP gather; and changing a hydrocarbon extraction technique based on the differences between the first and second corrected CDP gather.

* * * * *